United States Patent
Koizumi et al.

(10) Patent No.: US 9,685,842 B2
(45) Date of Patent: Jun. 20, 2017

(54) DIRECT DRIVE MOTOR, CONVEYANCE DEVICE, INSPECTION DEVICE, AND MACHINE TOOL

(71) Applicant: NSK LTD., Tokyo (JP)

(72) Inventors: Kazunori Koizumi, Kanagawa (JP); Kenichi Fukuyama, Kanagawa (JP); Hayao Watanabe, Kanagawa (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/304,653

(22) PCT Filed: Apr. 22, 2015

(86) PCT No.: PCT/JP2015/062273
§ 371 (c)(1),
(2) Date: Oct. 17, 2016

(87) PCT Pub. No.: WO2015/163378
PCT Pub. Date: Oct. 29, 2015

(65) Prior Publication Data
US 2017/0047818 A1   Feb. 16, 2017

(30) Foreign Application Priority Data

Apr. 23, 2014   (JP) .................................. 2014-089368

(51) Int. Cl.
*H02K 11/00* (2016.01)
*H02K 7/14* (2006.01)
(Continued)

(52) U.S. Cl.
CPC .................. *H02K 7/14* (2013.01); *H02K 5/16* (2013.01); *H02K 7/08* (2013.01); *H02K 11/21* (2016.01); *H02K 24/00* (2013.01)

(58) Field of Classification Search
CPC .... H02K 5/1732; H02K 5/1737; H02K 5/173; H02K 29/08; H02K 11/21; H02K 11/215
(Continued)

(56) References Cited

U.S. PATENT DOCUMENTS 4,449,622 A * 5/1984 Okano .................... F01P 7/084
192/110 B
5,234,081 A * 8/1993 Watanabe .............. B23Q 1/287
188/366
(Continued)

FOREIGN PATENT DOCUMENTS

JP        9-215382 A      8/1997
JP     2002-349593 A     12/2002
(Continued)

OTHER PUBLICATIONS

Notice of Reasons for Refusal of Japanese Application No. 2014-089368 dated Sep. 1, 2015.
(Continued)

*Primary Examiner* — Thanh Lam
(74) *Attorney, Agent, or Firm* — Sughrue Mion, PLLC

(57) ABSTRACT

A direct drive motor includes: a motor unit including a stator and a rotor rotatable with respect to the stator; a housing including a first housing to which the stator is fixed and a second housing to which the rotor is fixed; a bearing that rotatably supports the second housing with respect to the first housing; and a rotation detector that detects a rotating state of the motor unit. The rotation detector is a single incremental-type resolver that detects a relative displacement of the rotor with respect to the stator.

6 Claims, 8 Drawing Sheets

(51) Int. Cl.
*H02K 24/00* (2006.01)
*H02K 5/16* (2006.01)
*H02K 11/21* (2016.01)
*H02K 7/08* (2006.01)

(58) Field of Classification Search
USPC .......................................... 310/68 B, 89, 90
See application file for complete search history.

(56) References Cited

U.S. PATENT DOCUMENTS

| | | | | |
|---|---|---|---|---|
| 5,245,234 A | * | 9/1993 | Okada | G02B 26/121 310/51 |
| 6,661,141 B1 | * | 12/2003 | Omi | F16C 19/54 310/90 |
| 2002/0183122 A1 | | 12/2002 | Sone et al. | |
| 2004/0075353 A1 | * | 4/2004 | Walther | F16C 25/083 310/90 |
| 2005/0218736 A1 | * | 10/2005 | Message | G01P 3/443 310/90.5 |
| 2011/0187215 A1 | * | 8/2011 | Sahara | H02K 23/04 310/89 |
| 2012/0043862 A1 | * | 2/2012 | Furukawa | H02K 1/278 310/68 B |
| 2013/0193812 A1 | * | 8/2013 | Oishi | H02K 7/088 310/68 B |

FOREIGN PATENT DOCUMENTS

JP 2008-180362 A 8/2008
JP 2012-178926 A 9/2012

OTHER PUBLICATIONS

International Search Report of PCT/JP2015/062273 dated Aug. 4, 2015.

* cited by examiner

DIRECT DRIVE MOTOR, CONVEYANCE DEVICE, INSPECTION DEVICE, AND MACHINE TOOL

CROSS-REFERENCE TO RELATED APPLICATION

This application is a National Stage of PCT international application Ser. No. PCT/JP2015/062273 filed on Apr. 22, 2015 which designates the United States, incorporated herein by reference, and which is based upon and claims the benefit of priority from Japanese Patent Application No. 2014-089368 filed on Apr. 23, 2014, the entire contents of which are incorporated herein by reference.

FIELD

The present invention relates to a direct driver motor, and also relates to a conveyance device, an inspection device, and a machine tool, including the direct drive motor.

BACKGROUND

There is a known direct drive motor (hereinafter, also referred to as a DD motor) that employs a drive system (motor load direct-coupled drive system) that causes a rotational force to be directly transmitted to a rotating body to cause the rotating body to rotate in a predetermined direction with respect to a non-rotating body. This type of DD motor includes a motor unit, a bearing, a rotation detector (resolver), and a housing, and its outline is generally formed in a substantially cylindrical shape. In order to achieve miniaturization of a conveyance device, an inspection device, a machine tool, or the like, that includes the DD motor, it is desirable to employ a flat structure that has reduced installation area (footprint) of the housing of the DD motor, and reduced height of the housing in the axial direction. Accordingly, in the known techniques, to achieve reduction in the footprint of the DD motor, structures with the motor unit, the bearing, and the rotation detector (resolver) arranged in tandem in an axial direction are proposed (for example, refer to Patent Literature 1).

CITATION LIST

Patent Literature

Patent Literature 1: Japanese Laid-open Patent Publication No. 2008-180362

SUMMARY

Technical Problem

Meanwhile, the DD motor detects a rotating state (e.g., rotational speed, rotational direction, or rotation angle) of an output shaft with higher accuracy so as to position the output shaft while rotating it with high accuracy. In this case, in order to detect commutation timing of motor current at a motor unit, two types of rotation detectors (resolvers), namely, an absolute resolver and an incremental resolver, are mounted, which are arranged in tandem in an axial direction. This configuration including the two types of resolvers causes dimensions of the DD motor in the axial direction to increase.

To solve the above-described problem, an objective of the present invention is to provide a direct drive motor having reduced footprint and reduced height in the axial direction, a conveyance device, an inspection device, and a machine tool, including the direct drive motor.

Solution to Problem

To solve the above problem, a direct drive motor according to an aspect of the present invention includes: a motor unit including a stator and a rotor rotatable with respect to the stator; a housing including a first housing to which the stator is fixed and a second housing to which the rotor is fixed; a bearing that rotatably supports the second housing with respect to the first housing; and a rotation detector that detects a rotating state of the motor unit. The rotation detector is a single incremental-type resolver that detects a relative displacement of the rotor with respect to the stator.

With this configuration, the rotation detector is formed with a single incremental-type resolver that detects a relative displacement of a rotor with respect to a stator. This configuration suppresses an increase in the height in the axial direction and achieves miniaturization in the axial direction.

In this aspect, the direct drive motor may include: a power factor detector that detects a position where a power factor becomes zero when power supply for the motor unit is turned on; and a commutation controller that controls commutation of the motor unit based on the position where the power factor becomes zero and based on incremental information output from the resolver. With this configuration, it is possible to detect a rotating state of the DD motor even with a configuration in which a single resolver is mounted.

The motor unit, the bearing, and the resolver may be arranged alongside each other in an axial direction of the bearing. With this configuration, it is possible to suppress enlargement of the DD motor in the diameter direction and to reduce footprint.

At least one of the first housing and the second housing may include: a collar extending on one axial-direction end surface side of the bearing; and a retaining ring arranged on the other axial-direction end surface side of the bearing. A press ring formed of resin material may be provided either at a gap between the collar and the one axial-direction end surface of the bearing, or at a gap between the retaining ring and the other axial-direction end surface of the bearing. With this configuration, the press ring formed of resin material is provided either at the gap between the collar and one axial-direction end surface of the bearing, or at the gap between the retaining ring and the other axial-direction end surface of the bearing. Accordingly, this press ring accommodates width dimension tolerance of the retaining ring and the bearing in the axial direction, making it possible to prevent the bearing from moving in the axial direction with a simple configuration.

The second housing may be formed into a substantially cylindrical shape, located further away from the axis of the bearing than the first housing, and integrally and seamlessly molded in the axial direction. With this configuration, it is possible to support the bearing without enlarging the second housing in the axial direction and to achieve miniaturization of the DD motor.

A conveyance device according to another aspect of the present invention includes the direct drive motor. The conveyance device conveys a conveyance target by rotation of the second housing. With this configuration, it is possible to enhance positional accuracy in conveying the conveyance target and to achieve miniaturization of the conveyance device.

An inspection device according to another aspect of the present invention includes: the direct drive motor; and an inspection unit that individually inspects a target moved by rotation of the second housing. With this configuration, it is possible to enhance positional accuracy in moving the target to the inspection unit and to achieve miniaturization of the inspection device.

A machine tool according to another aspect of the present invention includes: the direct drive motor; and a processing unit that individually processes a target moved by rotation of the second housing. With this configuration, it is possible to enhance positional accuracy in moving the target to the processing unit and to achieve miniaturization of the machine tool.

Advantageous Effects of Invention

According to the aspects of this invention, the rotation detector is formed with a single incremental-type resolver that detects a relative displacement of a rotor with respect to a stator. This configuration suppresses an increase in the height in the axial direction and achieves miniaturization of the direct drive motor in the axial direction.

DESCRIPTION OF EMBODIMENTS

Embodiments of the present invention will be described in detail with reference to the drawings. The present invention is not limited by the following embodiments. Constituent elements in the following embodiments include elements easily assumed by a person skilled in the art, or equivalents. Moreover, constituent elements in the following embodiments may be appropriately combined with each other.

Figure 1:
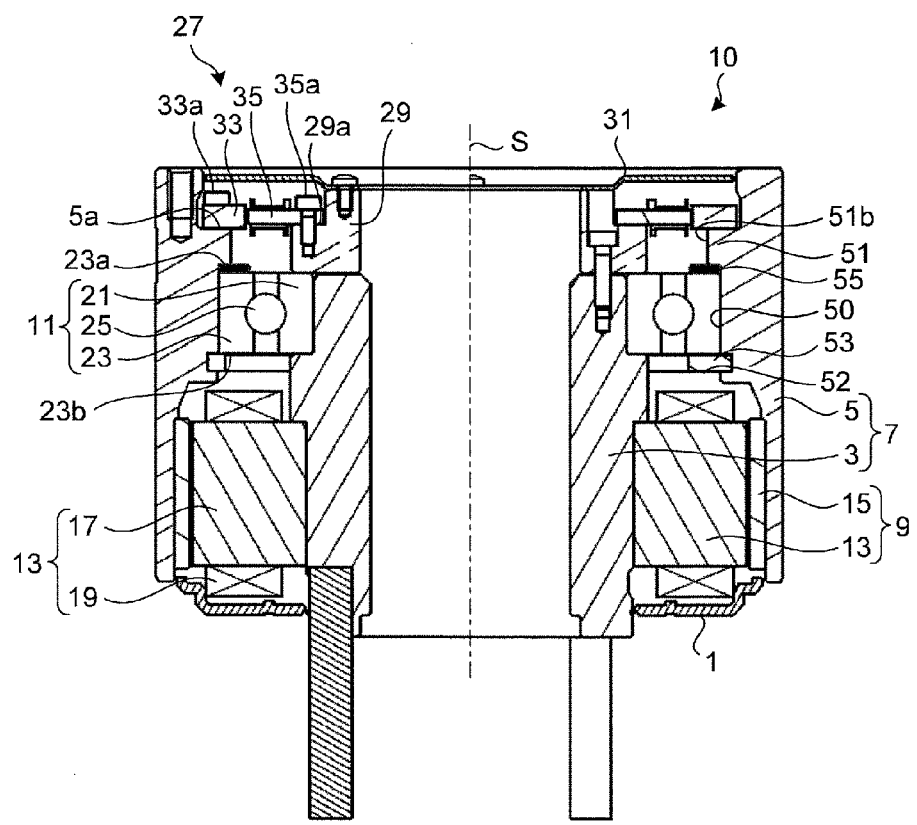
FIG. 1 is a sectional view illustrating a configuration of a direct drive motor according to the present embodiment.

FIG. 1 is a sectional view illustrating a configuration of a direct drive motor according to the present embodiment. A direct drive motor (hereinafter, referred to as a DD motor) 10 is capable of transmitting a rotational force to a rotating body without having a deceleration mechanism inbetween (e.g., deceleration gear and transmission belt) and capable of rotating the rotating body in a predetermined direction.

The DD motor 10 in the present embodiment is formed as a motor of an outer rotor type. As illustrated in FIG. 1, the DD motor 10 includes a housing 7. The housing 7 includes a housing inner (first housing) 3 and a rotor flange (second housing) 5. The housing inner 3 has an annular shape and is fixed to a base 1. The rotor flange 5 has an annular shape and is located outside the housing inner 3. The DD motor 10 also includes a motor unit 9 and a bearing 11. The motor unit 9 is incorporated between the housing inner 3 and the rotor flange 5 and rotates the rotor flange 5 with respect to the housing inner 3. The bearing 11 rotatably supports the rotor flange 5 onto the housing inner 3.

The housing inner 3 and the rotor flange 5 are formed into substantially cylindrical shapes with different diameters and arranged concentrically with respect to a rotation axis S. The rotor flange 5 is integrally and seamlessly molded in an extending direction (up-down direction in FIG. 1) of the cylinder. In other words, the rotor flange 5 is formed into a substantially cylindrical shape continuing along the whole circumference from a lower-end portion to an upper-end portion in the axial direction of the rotation axis S. Additionally, it is possible to mount a various workpieces (not illustrated) on its upper-end portion. Rotating the rotor flange 5 by the motor unit 9 makes it possible to rotate various workpieces together with the rotor flange 5 in a predetermined direction. In this manner, the rotor flange 5 rotates around the rotation axis S by operation of the motor unit 9, and thus, functions as an output shaft. The housing inner 3 is formed into a substantially cylindrical shape continuing along the whole circumference from a lower-end portion to the bearing 11 in the axial direction of the rotation axis S. In this configuration, the bearing 11 is held between the housing inner 3 and an inner ring retainer 29.

The motor unit 9 is arranged below the housing 7 (near the base 1). The motor unit 9 includes a stator 13 and a rotor 15. The stator 13 is fixed on an outer peripheral surface of the housing inner 3. The rotor 15 is fixed on an inner peripheral surface of the rotor flange 5 and arranged to face the stator 13. The stator 13 includes motor cores 17 that are arranged concentrically at a predetermined interval (for example, at an equal interval) along the rotational direction of the rotor flange 5. A stator coil 19 having multiple strands is fixed to each of the motor cores 17. Wiring for supplying power from a control unit 20 (FIG. 2) is connected to the stator 13, and power is supplied to the stator coil 19 through the wiring. The rotor 15 is formed with permanent magnets arranged concentrically along the rotational direction of the rotor flange 5, at a predetermined interval (for example, at an equal interval). When the stator coil 19 is energized through the control unit 20, a rotational force is given to the rotor flange 5 according to the Fleming's left-hand rule, causing the rotor flange 5 to rotate in a predetermined direction.

Compared with the position of the motor unit 9, the bearing 11 is arranged at a position further away from the base 1 in the axial direction. The bearing 11 includes an inner ring 21, an outer ring 23, and a plurality of rolling elements 25. The inner ring 21 and the outer ring 23 are relatively rotatably arranged to face each other. The plurality of rolling elements 25 is rollably positioned between the inner ring 21 and the outer ring 23. The bearing 11 is preferably a single bearing capable of loading both an axial load and a moment load. For example, a four-point-contact ball bearing, a three-point-contact ball bearing, a deep groove ball bearing, or a cross roller bearing can be employed as the bearing 11. In a case where the cross roller bearing is employed, it would be desirable to use a bearing of a non-split structure type in which both an inner ring and an outer ring cannot be split, rather than a bearing of a typical split structure type in which either an inner ring or an outer ring is split. The inner ring 21 is held between the housing inner 3 and the inner ring retainer 29, and the outer ring 23 is fixed to the inner peripheral surface of the rotor flange 5. A supporting structure of the bearing 11 will be described below.

The DD motor 10 has a resolver (rotation detector) 27 for detecting rotating states (e.g., rotational speed, rotational direction, or rotation angle) of the motor unit 9, above the bearing 11 (namely, at a position being further away from the base 1 in the axial direction, compared with the position of the bearing 11). With this configuration, it is possible to correctly rotate various workpieces mounted to the rotor flange 5 by a prescribed angle, and to position the workpieces at target positions with high accuracy. The resolver 27 is protected, being isolated from the outside by a disc-shaped cover 31 provided above the inner ring retainer 29 connected to the housing inner 3.

In the present embodiment, the DD motor 10 has a configuration in which the motor unit 9, the bearing 11, and the resolver 27 are arranged in tandem in the axial direction of the rotation axis S (up-down direction in FIG. 1) within the housing 7. This configuration suppresses an increase in the size of the DD motor 10 in the diameter direction around the rotation axis S, making it possible to achieve reduction of installation area (footprint) of the housing 7. In recent years, there is another demand for a DD motor that has achieved reduction not only in the installation area of the housing but also in the height dimension in the axial direction. In a typical DD motor, in order to detect rotating state of the motor unit with higher accuracy, two types of resolvers, namely, an absolute resolver and an incremental resolver, are mounted as rotation detectors, which are arranged in tandem in the axial direction. This configuration in which two types of resolvers are mounted on the DD motor unwantedly increases dimensions of the DD motor in the axial direction.

In the present embodiment, in order to overcome this problem, the single resolver 27 is solely arranged within the housing 7. The resolver 27 is an incremental resolver that detects a relative displacement of the rotor 15 with respect to the stator 13. The resolver 27 includes a resolver rotor 33 and a resolver stator 35. The resolver rotor 33, having an annular shape, has an internal periphery that is made eccentric to the axial center of the bearing 11. The resolver stator 35 is arranged to face the resolver rotor 33 with a predetermined interval and detects reluctance change with respect to the resolver rotor 33. Using a bolt 33a, the resolver rotor 33 is integrally mounted to a resolver rotor fixing section 5a formed on the inner peripheral surface of the rotor flange 5. Using a bolt 35a, the resolver stator 35 is integrally mounted to a resolver stator fixing section 29a formed on an outer peripheral surface of the inner ring retainer 29. By making the resolver rotor 33 eccentric and causing a distance between the resolver rotor 33 and the resolver stator 35 to change in the circumferential direction, reluctance changes depending on the position of the resolver rotor 33. With this configuration, one rotation of the rotor flange 5 corresponds to one cycle of a fundamental wave component of the reluctance change, and accordingly, the resolver 27 outputs a resolver signal (incremental information) that changes depending on a rotation angle position of the rotor flange 5.

Figure 2:
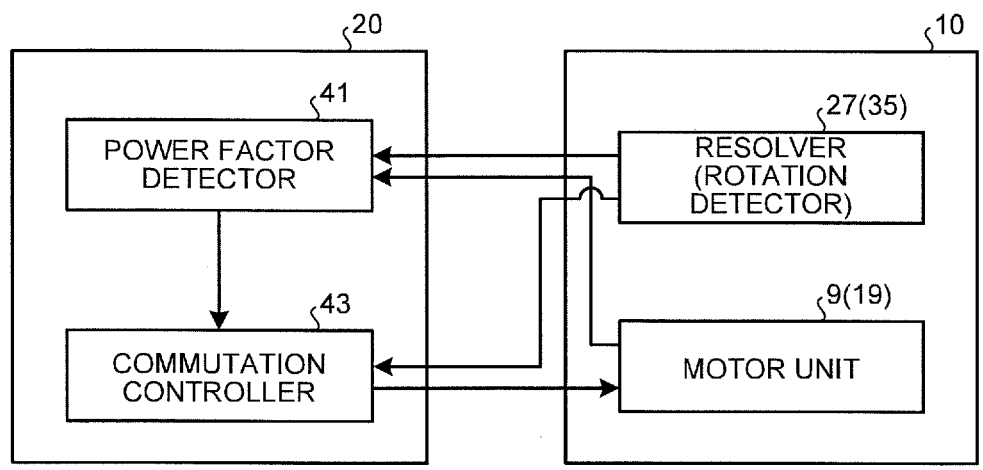
FIG. 2 is a block diagram illustrating a configuration for controlling a rotation angle position of the direct drive motor.

FIG. 2 is a block diagram illustrating a configuration for controlling the rotation angle position of the DD motor. The control unit 20 that controls operation of the DD motor 10 is connected with the DD motor 10. The control unit 20 includes a power factor detector 41 and a commutation controller 43. The power factor detector 41 detects a power factor based on a resolver signal detected by the resolver 27, the motor current output from the motor unit 9, or the like. The commutation controller 43 controls commutation of the motor unit 9 based on the detected power factor and the resolver signal.

In the present embodiment, the power factor detector 41 detects a position of the resolver rotor 33 where the power factor becomes zero when power supply for the motor unit 9 (stator coil 19) is turned on, and sets the detected position as a reference position. Subsequently, the power factor detector 41 outputs the reference position to the commutation controller 43. The commutation controller 43 obtains a resolver signal detected by the resolver 27 and controls commutation timing of the motor current flowing through the motor unit 9 based on the change of the resolver signal and based on the reference position. With this control, an absolute resolver is not needed when the commutation timing of the motor current is detected, and thus, it is not required to install two types of rotation detectors, namely, the absolute resolver and an incremental resolver as in conventional configuration. Accordingly, the DD motor can be formed with a single resolver, increase in the height of the DD motor 10 in the axial direction can be suppressed.

Meanwhile, since the DD motor 10 needs to position, with high accuracy, the rotor flange 5 as an output shaft, while rotating the rotor flange 5, it is required to detect the rotating state of the rotor flange 5 with higher accuracy. To achieve this, a supporting structure of the bearing 11 for supporting the housing inner 3 and the rotor flange 5 is important, and in particular, it is demanded to provide a structure capable of easily suppressing a movement (thrust play) of the bearing 11 in the axial direction. Next, the supporting structure of the bearing 11 will be discussed.

On the inner peripheral surface of the rotor flange 5, an outer ring fixing section 50 is formed along the whole circumference. On the resolver 27 side of the outer ring fixing section 50, a collar 51 having a smaller diameter than the outer diameter of the bearing 11 (outer ring 23) and protruding to the inner side is formed along the whole circumference. Moreover, on the motor unit 9 side of the outer ring fixing section 50, a groove portion 52 that has a larger diameter than the outer diameter of the bearing 11 (outer ring 23) is formed. The collar 51 extends on an axial-direction one end surface (resolver 27-side end surface) 23a side of the outer ring 23. The collar 51 is preferably formed such that an inner peripheral surface 51b of the collar 51 is positioned outside the inner peripheral surface of the outer ring 23 and positioned inside the chamfered portion of the outer ring 23. With this configuration, it is possible to reliably support the outer ring 23 of the bearing 11 by using the collar 51.

A C-shaped retaining ring (retaining ring) 53 having a spring force to expand in an outer diameter direction is attached at the groove portion 52. The C-shaped retaining ring 53 extends on an axial-direction other end surface (motor unit 9-side end surface) 23b side of the outer ring 23. The outer diameter of the groove portion 52 is slightly larger than the outmost diameter of the outer ring 23 of the bearing 11, and thus, the C-shaped retaining ring 53 is not dislodged when an allowable load of the bearing 11 itself is applied onto the C-shaped retaining ring 53. Note that, as a retaining ring, not only the C-shaped retaining ring but also a spring ring can be employed.

In this manner, the bearing 11 is held between the collar 51 and C-shaped retaining ring 53 that are respectively provided at upper and lower (both end) portions of the outer ring fixing section 50 in the axial direction. In usual cases, however, considering that the bearing 11 and the C-shaped retaining ring 53 each have a dimension tolerance in the axial direction, and that the groove portion 52 has a processing error, it would be difficult to support the bearing 11 by the collar 51 and the C-shaped retaining ring 53 while completely suppressing movement (thrust play) of the bearing 11 in the axial direction. To cope with this, in the present configuration, a press ring 55 formed with a polymer resin material is arranged at a gap between the axial-direction one end surface 23a of the outer ring 23 and the collar 51. The press ring 55 is formed of a polymer resin material such as thermoplastic resin or thermosetting resin into an annular shape and capable of accommodating width dimension tolerance of the bearing 11 in the axial direction, as well as completely preventing movement of the bearing 11 in the axial direction.

As in the present embodiment, in a case where the DD motor 10 includes the press ring 55 formed of thermoplastic resin, it is preferable to employ thermoplastic resin having heat resistance temperature of 100° C. or higher. It would be also preferable to use thermoplastic resin having excellent characteristics in compressive yield strength, flexural strength, compressive modulus (or tensile modulus, Young's modulus), or the like. Exemplary preferable materials include a material called super engineering plastics such as polyether ether ketone (PEEK), polyether sulfone (PES), and polyphenylene sulfide (PPS), from the viewpoint of the heat resistance temperature and mechanical properties. When the solvent resistance is required, crystalline resin would be preferable. However, when applied in the DD motor 10, it is possible to use any of crystalline resin and amorphous resin. In forming the press ring, the thermoplastic resin that can be used not only for machining but also for molding is more preferable.

Figure 3:
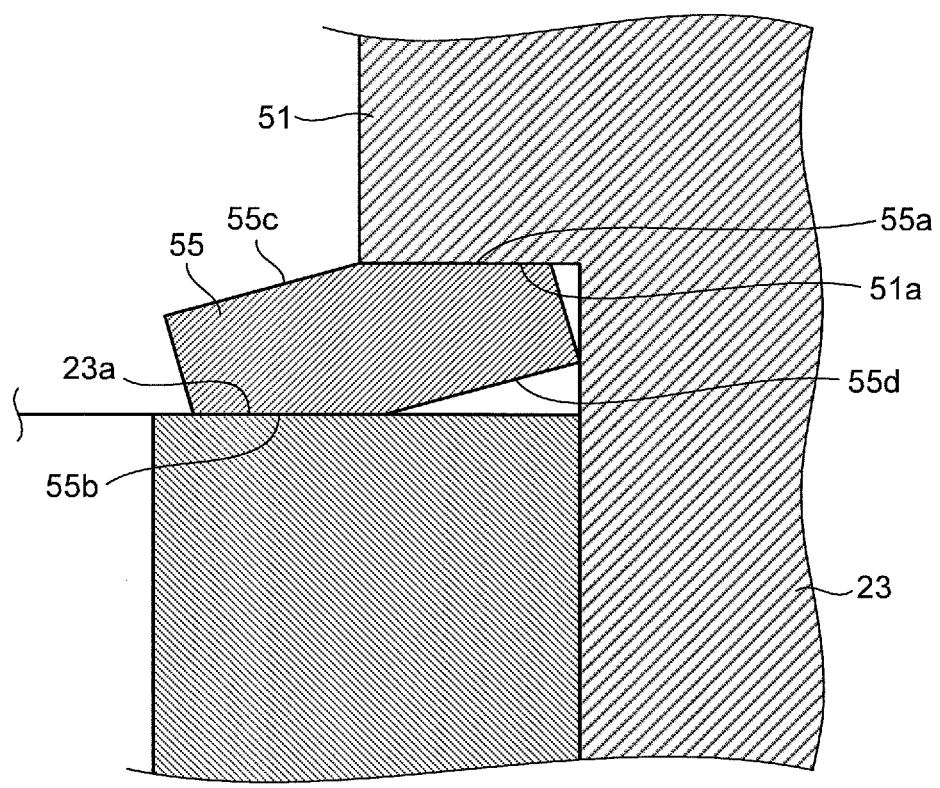
FIG. 3 is a partially enlarged sectional view illustrating a sectional shape of a press ring.

Based on thickness variation of the C-shaped retaining ring 53, processing errors in the position and height of the groove portion 52, and the width dimension tolerance of the bearing 11 in the axial direction, it is possible to calculate the amount of strain required for the press ring 55 molded in thermoplastic resin. This amount of strain is the amount of strain at a state where a basic load rating for the bearing 11 has been added so as not to break the bearing 11. The diameter dimensions of the collar 51 and the outer ring 23 are substantially equal. Therefore, in a case where the press ring 55 is formed into a simple flat ring shape having a substantially equal diameter size as the outer ring 23, the allowable amount of strain becomes very small because the amount of strain is determined by longitudinal elasticity or Young's modulus of the resin. Therefore, in the present embodiment, as illustrated in FIG. 3, the press ring 55 includes a first contact surface 55a and a second contact surface 55b. The first contact surface 55a comes in contact with a support surface 51a of the collar 51. The second contact surface 55b comes in contact with the axial-direction one end surface 23a of the outer ring 23. The first contact surface 55a and the second contact surface 55b are formed at positions being shifted in the diameter direction of the press ring 55. Specifically, the press ring 55 has a substantially hexagonal sectional shape and includes a first inclined surface 55c and a second inclined surface 55d. The first inclined surface 55c is continued from the first contact surface 55a and inclined in a direction away from the support surface 51a. The second inclined surface 55d is continued from the second contact surface 55b and inclined in a direction away from the axial-direction one end surface 23a. The second inclined surface 55d is arranged below the first contact surface 55a in the axial direction. The first inclined surface 55c is arranged above the second contact surface 55b in the axial direction. With this arrangement, in a case where a load in the axial direction is applied onto the press ring 55, the press ring 55 strains with the use of, for example, a gap between the second inclined surface 55d and the axial-direction one end surface 23a of the outer ring 23, and thus can obtain a great amount of strain (deflection) of the press ring 55, leading to effective deformation.

Once being arranged, the press ring 55 has a compression characteristic that is not significantly changed with temperature, gentle creep properties and fatigue characteristics, and thus, can suppress generation of movement of the bearing 11 in the axial direction in a state of being incorporated into the DD motor 10. An external load being applied to the rotor flange 5, for example, would generate a very small displacement, and thus, would not cause malfunction of the resolver 27. Accordingly, even in the configuration in which the single resolver 27 controls operation as in the present configuration, it is possible to perform rotation control with high accuracy. Furthermore, since the press ring 55 is molded with a resin material excellent in compression characteristics, the displacement returns to an original state when the external load is removed.

In this manner, in the present embodiment, the rotor flange 5 includes the collar 51 extending on the axial-direction one end surface 23a side of the outer ring 23 of the bearing 11 and the C-shaped retaining ring 53 extending on the axial-direction other end surface 23b side of the outer ring 23, and the press ring 55 formed of resin material is arranged at a gap between the collar 51 and the axial-direction one end surface 23a. Accordingly, it is possible, with a simple configuration, to accommodate width dimension tolerance of the bearing 11 in the axial direction and to completely prevent movement of the bearing 11 in the axial direction.

Figure 4:
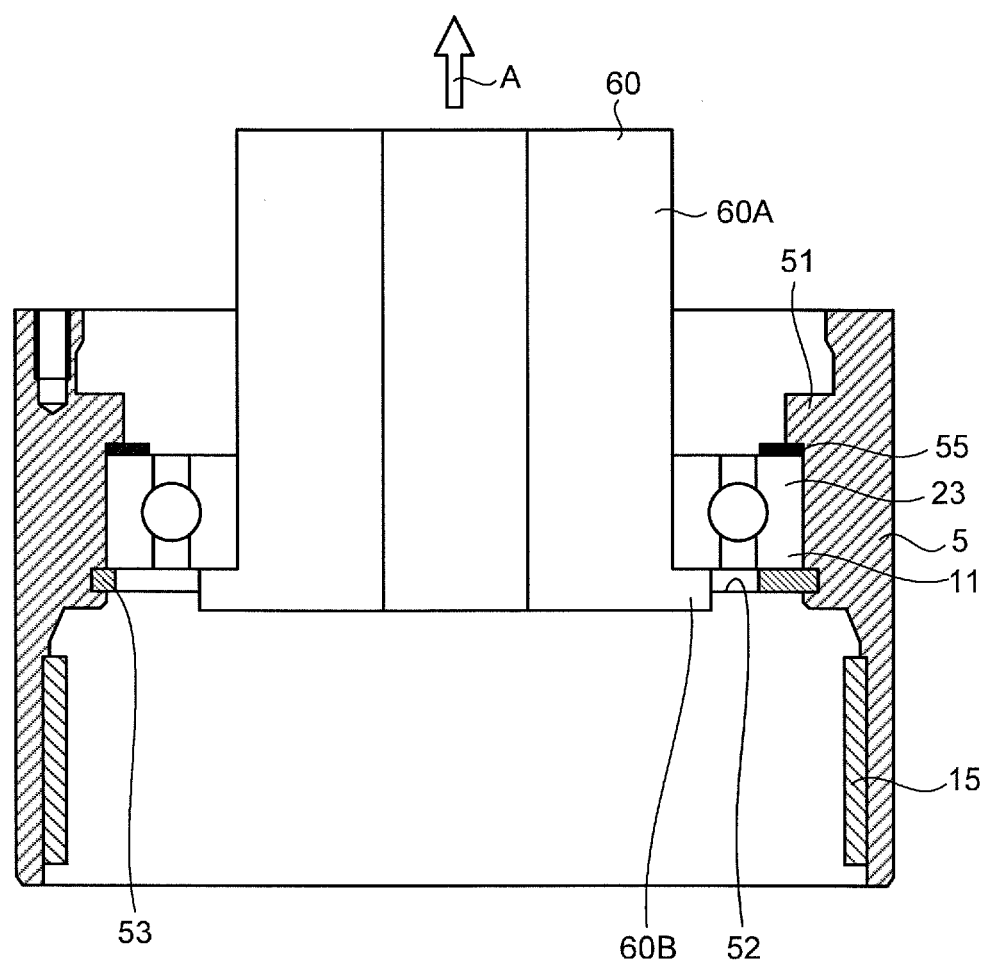
FIG. 4 is a diagram for illustrating a procedure of mounting a press ring formed with thermoplastic resin.

Next, a procedure of mounting the press ring 55 molded with thermoplastic resin will be described. FIG. 4 is a sectional view illustrating a procedure of mounting the press ring 55. Specifically, as illustrated FIG. 4, the press ring 55 is arranged between the collar 51 and the bearing 11, and then, a tool 60 is attached. The tool 60 includes a main body 60A to be fitted into the inner ring 21 of the bearing 11 and a flange 60B that abuts against the inner ring 21 at an outer peripheral portion of the main body 60A. Using the tool 60, a load is applied to the bearing 11 and the press ring 55 in a compression direction (direction A in FIG. 4), and while the load is being applied, the C-shaped retaining ring 53 is attached to the groove portion 52. With this procedure, assembly of the bearing 11 can be performed without any gap on the bearing 11 in the axial direction. The load in the compression direction at assembly is preferably the axial basic load rating of the bearing 11, or below. By limiting this value, at its maximum, to the axial basic load rating or below, it would be possible to avoid damage to the bearing 11 at assembly.

Figure 5:
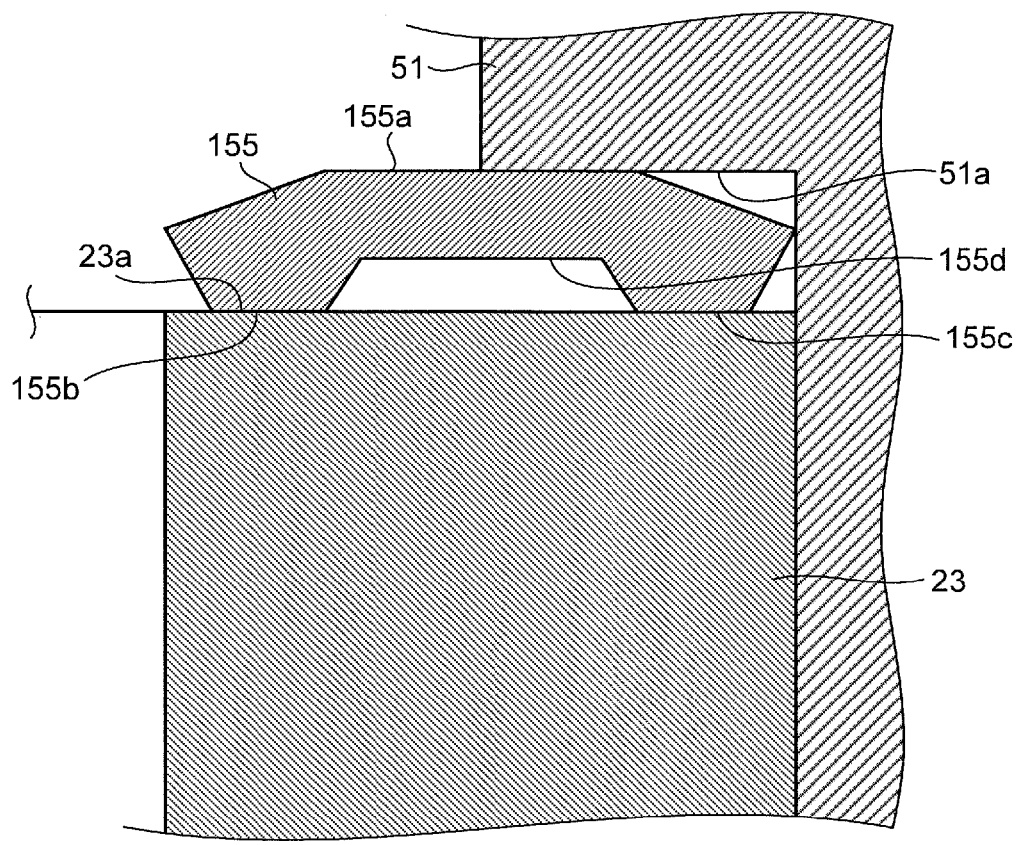
FIG. 5 is a partially enlarged sectional view illustrating a sectional shape of a press ring according to another embodiment.

In the present embodiment, the press ring 55 has a substantially hexagonal sectional shape as an example. The shape of the press ring, however, is not limited to the above-described shape. For example, as illustrated in FIG. 5, the press ring may be a press ring 155 including a first contact surface 155a coming in contact with the support surface 51a of the collar 51 and second contact surfaces 155b and 155c coming in contact with the axial-direction one end surface 23a, of the outer ring 23. In the press ring 155, the second contact surfaces 155b and 155c are formed separately from each other in the diameter direction. The press ring 155 also includes a gap portion 155d between these second contact surfaces 155b and 155c, with the first contact surface 155a being located above the gap portion 155d in the axial direction. In other words, the press ring 155 includes the first contact surface 155a and the second contact surfaces 155b and 155c that are shifted with each other in the diameter direction. Even with this shape, the press ring 155 strains with the use of the gap portion 155d, and thus can obtain a sufficient amount of strain (deflection) of the press ring 155, leading to effective deformation.

In the above-described embodiment, the press ring 55 is formed of thermoplastic resin. Alternatively, it is also possible to form the press ring by filling thermosetting resin between the collar 51 and the axial-direction one end surface 23a of the bearing 11 (outer ring 23). Two-component epoxy resin adhesives are most desirable to be used as the thermosetting resin. This has the following three advantages: First, because of its long curing time, it is easy to obtain the time to fill the thermosetting resin while a compression load is applied to areas around the bearing 11. Second, while it is curable at ambient temperatures, it is also possible to accelerate curing by slightly raising the temperature to, for example, 60° C. Third, since this is two-component type, it is not easily affected by variation in curing conditions due to working environments, compared with the type that responses to air moisture, or the like. In addition, since grease is encapsulated in the bearing 11, it is desirable to use the type of adhesive that starts curing reaction within an allowable temperature range for operation of the bearing 11. The epoxy resin adhesive has the least level of change in the mechanical strength (e.g., tensile-shear strength) even when the temperature increases. The total variation in dimensions of the bearing 11 and the C-shaped retaining ring 53 is normally 0.2 mm or below, more specifically, is approximately 0.06 mm, which is suitable as curing conditions for the epoxy resin. Moreover, the epoxy resin adhesive has characteristically high compressive strength, compared with shear and peeling strengths, and thus, is desirable as a material to fill the gap.

Figure 6:
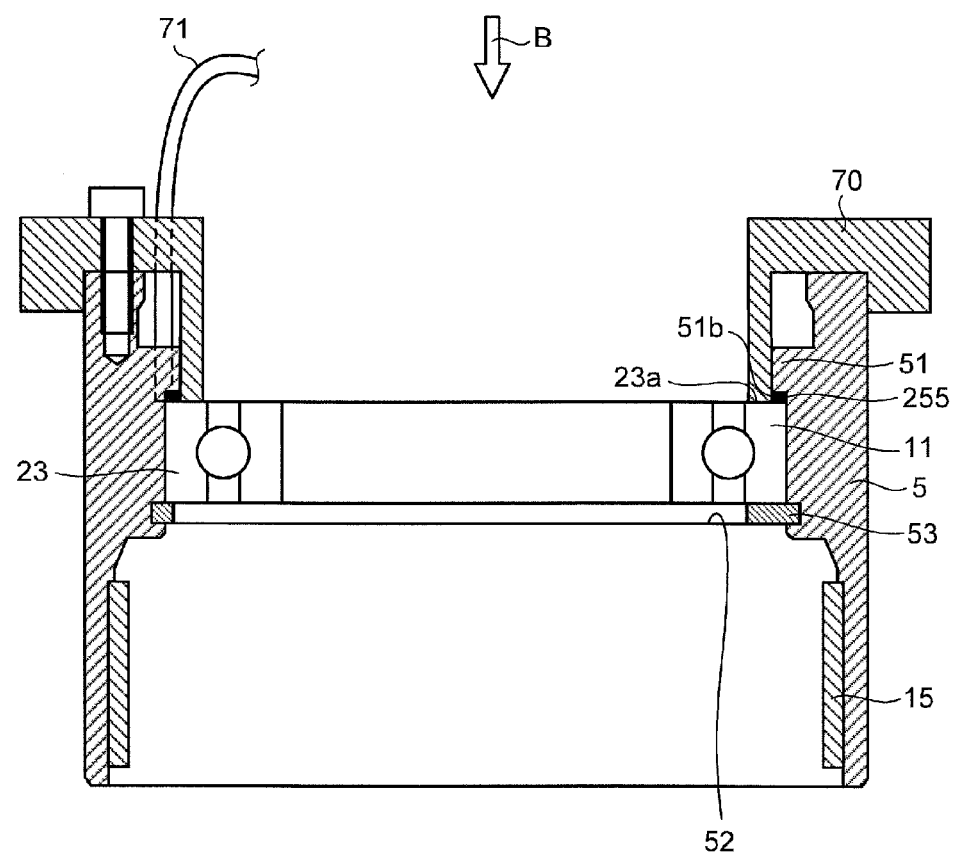
FIG. 6 is a diagram illustrating a procedure of filling thermosetting resin into a portion between a collar and an axial-direction one end surface of a bearing.

FIG. 6 is a diagram illustrating a procedure of filling the thermosetting resin into a portion between the collar 51 and the axial-direction one end surface 23a of the bearing 11 (outer ring 23). In a case where the thermosetting resin is used, the bearing 11 is assembled into the collar 51, and also the C-shaped retaining ring 53 is assembled into the collar 51. With this state, using a push-in tool 70 illustrated in FIG. 6, the compression load is applied in a direction (direction B in FIG. 6) to crush the axial-direction gap between the C-shaped retaining ring 53 and the bearing 11. Subsequently, while the compression load is being applied, thermosetting resin on which chemical reaction is started by mixing but curing is not started is filled into the gap using a thin tube 71 to mold a press ring 255. In view of mechanical properties of the thermosetting resin to be filled, specifically, the resin's compressive strength, thermal contraction, and creep properties, it is desirable to set the compression load to a value on which the mechanical properties of the press ring 255 would not cause a problem when the motor is in use. Alternatively, as illustrated in FIG. 6, it is also allowable to fill the thermosetting resin using the push-in tool 70 while the bearing 11 is pushed into the C-shaped retaining ring 53 side. As another method, it is also allowable to provide a tap at the collar 51 and to perform pushing-in using the screw of the tap. Alternatively, it is also allowable to previously apply the thermosetting resin to the collar 51, install the C-shaped retaining ring 53 in such a way to allow adjustment of the gap between the C-shaped retaining ring 53 and the bearing 11, and then, to provide thermosetting resin therebetween.

Figure 7:
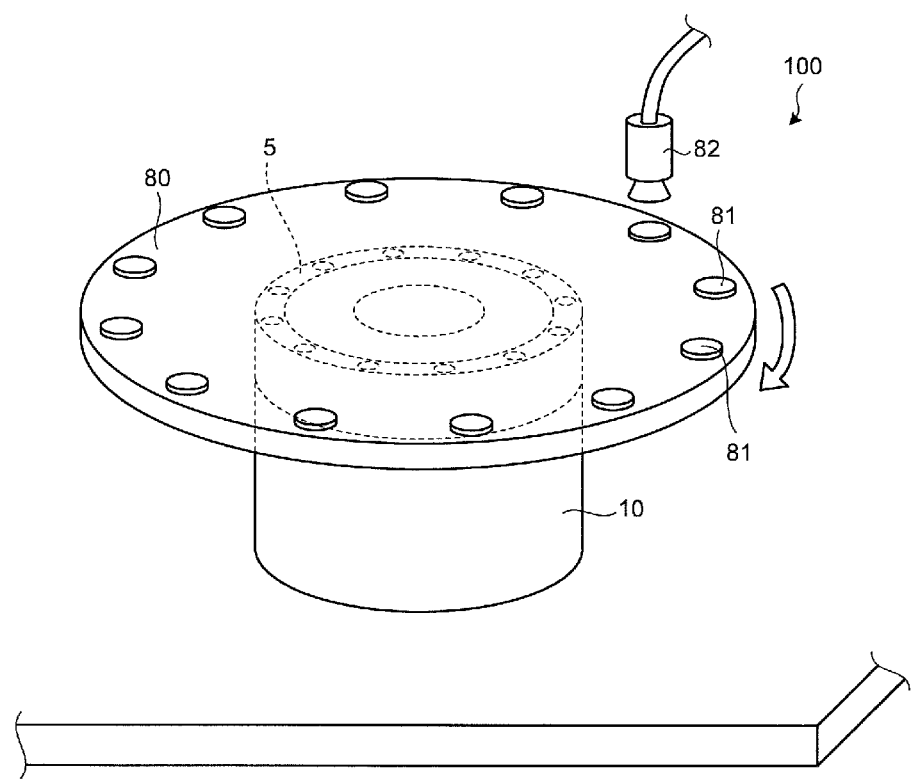
FIG. 7 is a schematic diagram of an inspection device that includes the direct drive motor according to the present embodiment.

FIG. 7 is a schematic diagram of an inspection device 100 that includes the DD motor 10 according to the present embodiment. A table 80 having a disk shape is connected to an upper end of the rotor flange 5 of the DD motor 10. The table 80 is rotated by operation of the rotor flange 5. At an edge portion of the table 80, inspection targets (conveyance targets, targets) 81 are arranged at equal intervals. With this configuration, the inspection targets 81 are rotated and conveyed together with the table 80 by operation of the DD motor 10. Accordingly, the conveyance device includes the DD motor 10 and the table 80. Above the edge portion of the table 80, there is a camera (inspection unit) 82 for individually observing the inspection targets 81 rotated (conveyed) together with the table 80. By imaging with the camera 82, it is possible to inspect the inspection targets 81 based on the captured image. With this configuration, it is possible to enhance positional accuracy in moving an inspection target 81 to a position below the camera 82 and to achieve miniaturization of the inspection device 100.

Figure 8:
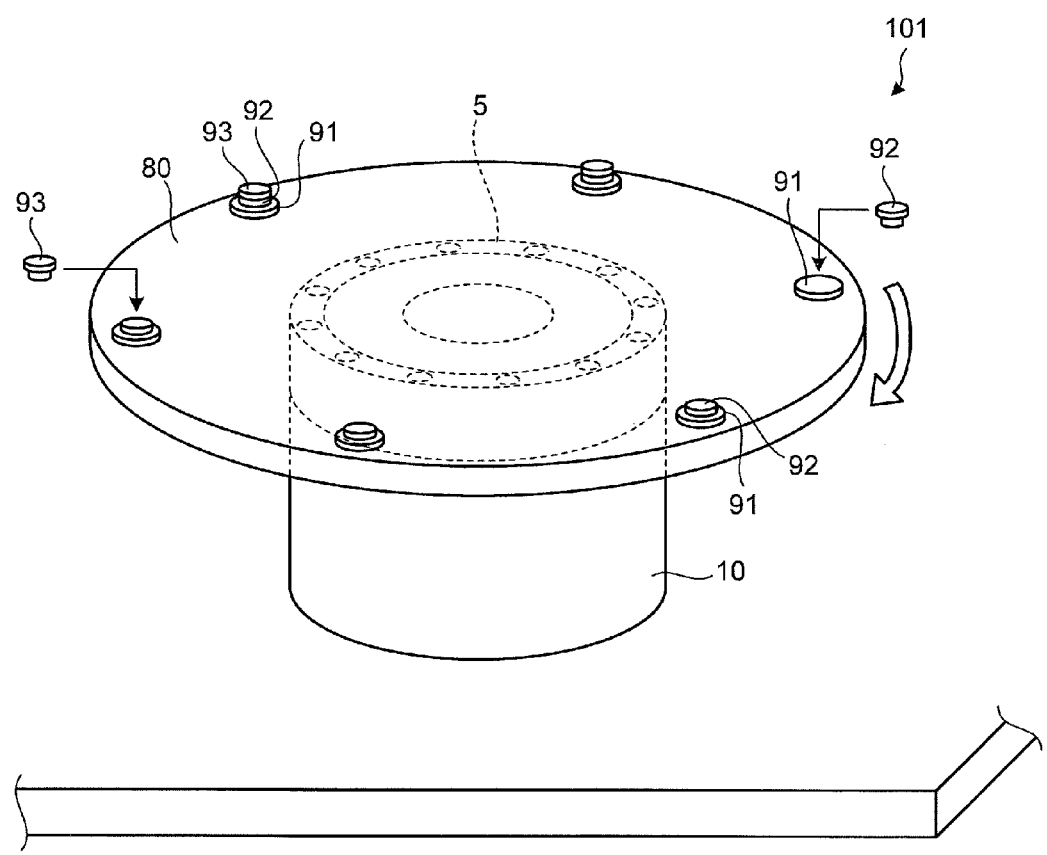
FIG. 8 is a schematic diagram of a machine tool that includes the direct drive motor according to the present embodiment.

FIG. 8 is a schematic diagram of a machine tool 101 that includes the DD motor 10 according to the present embodiment. A table 80 having a disk shape is connected to an upper end of the rotor flange 5 of the DD motor 10. The table 80 is rotated by operation of the rotor flange 5. At an edge portion of the table 80, processing targets (targets) 91 are arranged at equal intervals. Also at the edge portion of the table 80, for example, a loading robot (processing unit) is arranged to load new components 92 and 93 onto the processing targets 91, and it is possible to perform processing on the processing targets 91 along with the rotation of the table 80. With this configuration, it is possible to enhance positional accuracy in moving the processing target 91 to the position of the loading robot and to achieve miniaturization of the machine tool 101.

As described above, according to the present embodiment, there are provided the motor unit 9 including the stator 13 and the rotor 15 rotatable with respect to the stator 13, the housing 7 including the housing inner 3 to which the stator 13 is fixed and the rotor flange 5 to which the rotor 15 is fixed, the bearing 11 rotatably supporting the rotor flange 5 with respect to the housing inner 3, and the resolver 27 for detecting the rotating state of the motor unit 9, and in addition, the resolver 27 is a single incremental-type resolver that detects a relative displacement of the rotor 15 with respect to the stator 13. Accordingly, it is possible to suppress an increase in the height of the housing 7 in the axial direction and to achieve miniaturization of the DD motor 10.

Furthermore, according to the present embodiment, there are provided the power factor detector 41 detecting a position where the power factor becomes zero when the power supply for the motor unit 9 is turned on, and the commutation controller 43 controlling commutation of the motor unit 9 based on the position where the power factor becomes zero and based on the resolver signal output from the resolver 27, thereby negating the need for an absolute resolver when the commutation timing of the motor current is detected. Therefore, it is not required to mount two types of rotation detectors, namely, an absolute resolver and an incremental resolver as in conventional configuration, and thus configuration with a single resolver can be achieved. Accordingly, it is possible to detect the rotating state of the motor unit 9 with high accuracy and to suppress the height of the DD motor 10 in the axial direction.

Moreover, according to the present embodiment, the motor unit 9, the bearing 11, and the resolver 27 are arranged alongside each other in the axial direction of the bearing 11, making it possible to suppress enlargement from the rotation axis S as a center toward the diameter direction. Accordingly, it is possible to reduce installation area (footprint) of the DD motor 10.

Moreover, according to the present embodiment, the rotor flange 5 includes the collar 51 extending on the axial-direction one end surface 23a side of the outer ring 23 and the C-shaped retaining ring 53 arranged on the axial-direction other end surface 23b side of the outer ring 23. In addition, the press ring 55 formed of resin material is provided at the gap between the collar 51 and the axial-direction one end surface 23a. Accordingly, it is possible, with a simple configuration, to accommodate width dimension tolerance of the bearing 11 in the axial direction and together with this, to completely prevent movement of the bearing 11 in the axial direction.

Moreover, according to the present embodiment, the rotor flange 5 is formed into a substantially cylindrical shape, located further away from the axis of the bearing 11 than the housing inner 3, and integrally and seamlessly molded in the axial direction. Accordingly, it is possible to support the bearing 11 while suppressing enlargement of the rotor flange 5 in the axial direction and to achieve miniaturization of the DD motor 10.

Embodiments have been described as above but the embodiments are not intended to be limited to the above description. The DD motor 10 according to the present embodiment is an outer rotor type but the DD motor 10 may understandably be an inner rotor type. In the present embodiment, the support mechanism of the bearing 11 is provided to the rotor flange 5. However, it is not limited to this but may be provided to the housing inner 3 or to both of them. It would be most desirable that the press ring 55 is installed between the collar 51 and the axial-direction one end surface 23a of the bearing 11 (outer ring 23). Alternatively, however, the press ring 55 may be provided between the C-shaped retaining ring 53 and the axial-direction other end surface 23b of the bearing 11 (outer ring 23). Depending on the properties of polymeric material, it is possible to provide the press ring 55 on both sides (on the collar 51 side and the C-shaped retaining ring 53 side) of the axial-direction end surface of the bearing 11 (outer ring 23). In the present embodiment, a configuration with the single bearing 11 has been described. However, it is possible to achieve similar effects with a configuration in which a plurality of bearings is used in combination (including a case where a spacer is provided between the bearings). In the present embodiment, the inner ring 21 of the bearing 11 is held between the housing inner 3 and the inner ring retainer 29. However, since the outer ring 23 is tightly supported in the axial direction, it is also allowable to extend the housing inner 3 to the upper end in the same manner as the rotor flange 5, and fix the inner ring 21 on the outer peripheral surface of the housing inner 3 using adhesive or shrink fitting.

The invention claimed is:

1. A direct drive motor comprising:
   a motor unit including a stator and a rotor rotatable with respect to the stator;
   a housing including a first housing to which the stator is fixed and a second housing to which the rotor is fixed;
   a bearing that rotatably supports the second housing with respect to the first housing; and
   a rotation detector that detects a rotating state of the motor unit,
   wherein the rotation detector is a single incremental-type resolver that detects a relative displacement of the rotor with respect to the stator,
   the resolver includes a resolver rotor and a resolver stator, the resolver rotor being fixed to the second housing, and the resolver stator being arranged to face the resolver rotor with a predetermined interval and fixed to an inner ring retainer connected to the first housing,
   an inner ring of the bearing is held between the first housing and the inner ring retainer,
   the second housing includes a collar extending on one axial-direction end surface side of an outer ring of the bearing, and a retaining ring arranged on the other axial-direction end surface side of the outer ring,
   a press ring is provided either at a gap between the collar and the one axial-direction end surface of the outer ring, or at a gap between the retaining ring and the other axial-direction end surface of the outer ring, and
   the press ring is formed of a polymer resin material that is thermoplastic resin or thermosetting resin, accommodates width dimensional tolerance of the bearing and the retaining ring in the axial direction, and prevents relative movement of the bearing and the second housing in the axial direction.

2. The direct drive motor according to claim 1, wherein the motor unit, the bearing, and the resolver are arranged alongside each other in an axial direction of the bearing.

3. The direct drive motor according to claim 1, wherein the second housing is formed into a substantially cylindrical shape, located further away from the axis of the bearing than the first housing, and integrally and seamlessly molded in the axial direction.

4. A conveyance device comprising the direct drive motor according to claim 1, the conveyance device being configured to convey a conveyance target by rotation of the second housing.

5. An inspection device comprising:
   the direct drive motor according to claim 1; and
   an inspection unit that individually inspects a target moved by rotation of the second housing.

6. A machine tool comprising:
   the direct drive motor according to claim 1; and
   a processing unit that individually processes a target moved by rotation of the second housing.

* * * * *